United States Patent [19]

Curry

[11] Patent Number: 4,860,237

[45] Date of Patent: Aug. 22, 1989

[54] SCAN LINEARITY CORRECTION

[75] Inventor: Douglas N. Curry, Menlo Park, Calif.

[73] Assignee: Xerox Corporation, Stamford, Conn.

[21] Appl. No.: 637,660

[22] Filed: Aug. 3, 1984

[51] Int. Cl.$^4$ .............................................. G06F 1/02
[52] U.S. Cl. ................................................... 364/718
[58] Field of Search ................................. 364/702, 718

[56] References Cited

U.S. PATENT DOCUMENTS

| | | | |
|---|---|---|---|
| 3,015,444 | 1/1962 | Schneider | 364/718 |
| 3,254,203 | 5/1966 | Kveim | 364/718 |
| 3,689,914 | 9/1972 | Butler | 364/718 |
| 3,701,890 | 10/1972 | Dummermuth | 364/702 |
| 3,763,363 | 10/1973 | Saita et al. | 364/718 |
| 3,917,932 | 11/1975 | Saita et al. | 364/718 |
| 3,967,100 | 6/1976 | Shimomura | 364/718 |
| 4,125,897 | 11/1978 | Murata et al. | 364/702 |
| 4,342,245 | 8/1982 | Gross | 364/718 |
| 4,345,500 | 8/1982 | Alonso et al. | 364/702 |
| 4,365,309 | 12/1982 | Noguchi et al. | 364/702 |
| 4,586,037 | 4/1986 | Rosener et al. | 364/702 |

OTHER PUBLICATIONS

Richards, *Arithmetic Operations in Digital Computers*, pp. 303–311, D. Van Nostrand Co. Inc., Princeton, NJ 1961.

Primary Examiner—Gary V. Harkcom
Assistant Examiner—Dale M. Shaw
Attorney, Agent, or Firm—Robert E. Cunha

[57] ABSTRACT

A method for generating a variable frequency clock pulse for a raster scanner. First, a correction number, which may be the sum of corrections for scan-non-linearity, polygon signature errors and motor hunt errors, is generated. This number is then added periodically to a running sum. The most significant bit of this sum is then available as the clock pulse output. The frequency of the output clock will be proportional to the correction number. The described circuit uses an accumulating adder and a register loop to form an accumulator circuit. The correction number is then supplied to the other accumulator adder input, and the register is clocked with a fixed frequency sample clock pulse.

1 Claim, 2 Drawing Sheets

SCAN LINEARITY CORRECTION

This invention is related to two previously filed patent applications entitled Polygon Signature Correction, Ser. No. 614,928, now U.S. Pat. No. 4,622,593 and Facet-To-Facet Motor Hunt Correction, Ser. No. 615,002, now U.S. Pat. No. 4,639,789 both incorporated herein by reference.

BACKGROUND OF THE INVENTION

1. Field of the Invention

This invention is a circuit for correcting for poylgon scan errors in a raster input or output scanner, and more specifically is a high speed digital circuit clocked by a fixed frequency sample clock to produce a bit clock which has a variable frequency to effect scan correction.

An optical scanner may consist of a rotating light deflector which displaces a spot of light across a flat "scan line". "Scan deflectance" is a function which relates the position of the spot on the scan line to the angle of the deflector. Its angular derivative "scan revolvance", relates the change in position of the spot on the scan line to the angle of the deflector. A bit clock is used to regulate the flow of data into or out of the scanner system.

For the scanning system to function properly, there must be a well defined relationship between the bit clock frequency and the scan revolvance. For example, if a constant density of information on the scan line is required, then it may be appropriate to use a bit clock of constant frequency and a constant scan revolvance. Generally, the uncorrected scanner's scan deflectance is non-linear. Therefore, its scan revolvance is not constant. For instance, a typical cause of non-linearity is that the distance of the spot on the scan line to the center of rotation of the deflector increases as the spot moves away from the center of the scan line. Other non-linearities may be caused by the particular design of the scanner system. Since the bit clock used to regulate the flow of data into or out of the scanner system is generally constant during a scan, efforts have been made to make the scan revolvance constant also. Lenses may be employed to correct for the above-mentioned non-linearity by bending the spot toward the center of the scan line as the spot moves away from the center.

The speed at which the spot moves along the scan line is called "scan velocity". Ideally, scan velocity is proportional to scan revolvance. However, there are several factors which affect the constant of proportionality.

First, a scanning system may employ a series of deflectors, called facets, in a poligonal arrangement to increase the efficiency of the scanner system. Due to manufacturing anomalies, all the facets of the polygon are not necessarily at the same optical distance from the scan line. This means that each facet has its own constant of proportionality relating scan revolvance to scan velocity. This is called "polygon signature". Second, the deflector(s) may not turn at a constant rate. This is called "motor hunt". These system scanning errors may be minimized by either improving the polygon and drive systems, or by varying the clock rate to compensate for the errors.

2. Prior Art

In the inventor's prior patent applications, Facet-To-Facet Motor Hunt Correction and Polygon Signature Correction, an electronic method of correcting the bit clock rate was described. A sample clock having a fixed frequency slightly greater than N times the bit clock is first generated. From this stream of sample clocks, the exact number of evenly spaced pulses is removed so that, after being counted down by a factor of N, the resulting bit clock frequency is exactly correct to compensate for the motor hunt and signature errors for the current facet. The circuit shown uses a microprocessor to generate the number corresponding to the number of pulses between deleted sample clock pulses. This number is used to load a counter which is clocked by the sample clock. Every overflow is sent to a circuit which deletes one pulse from the stream of sample clocks. The modified sample clock bit stream is then counted down by N to create the system bit clock. A problem with this circuit is that there are too many possible frequencies to store in a table look-up, and a microprocessor is not fast enough to calculate corrections in real time.

SUMMARY OF THE INVENTION

The circuit described herein is a digital bit clock generator for producing a variable clock frequency which can be changed at any time. Using this circuit, corrections for polygon signature, motor hunt and scan non-linearity can be adjusted many times per scan. Signature and hunt corrections are quantities that do not change during a scan, while scan linearity must be continuously adjusted. All are determined through a calibration procedure that is performed before the start of scan. The scan linearity correction can be generated by a counter which increments periodically during the scan. The counter output is used to address a PROM which outputs the correction. This scan correction can then be added to the signature and motor hunt corrections, and supplied to an accumulator which, on a clocked basis, adds the sum of corrections to its running sum. The accumulator will overflow more or less often, depending on the size of the correction number, and this overflow can be used directly as the variable clock.

DESCRIPTION OF THE PREFERRED EMBODIMENT

Scan velocity error in a laser scanner is a major contributor to pixel placement errors. One method of correcting these errors in the scanning direction is by using a variable frequency pixel, or bit, clock whose frequency is proportional to the spot scanning velocity. A quality scanning system using such a clock will require high pixel densities, maintained while the clock is rapidly changing frequency. A digital means of providing the required clock is described herein. By using this circuit to generate a pixel clock which has a frequency that is proportional to a changing scan velocity, a constant pixel density may be maintained. This will enable the simultaneous correction of polygon signature, motor hunt and scan non-linearity.

Polygon signature describes a printing artifact caused by a facet-dependent change in scan velocity. It does not vary with time, can be pre-determined, and must be corrected once per scan. Its correction requires high resolution and accuracy in the frequency generating device. Motor hunt is a term describing a variation in the angular velocity of the motor, and therefore the polygon, which, in turn, varies the scan velocity in proportion to the change in RPM. It must be measured and corrected at least once per revolution during scanning, but requires little performance in the frequency generating device.

Scan non-linearity results when an optical system does not produce a uniform spot displacement for each increment in rotation of the polygon. It is manifested by a scan velocity variation which is a function of polygon angle. It does not vary with time, can be pre-determined, and must be corrected many times during a scan. This requires a large dynamic range, and accurate frequency slewing properties in the frequency generating device.

Figure 1:
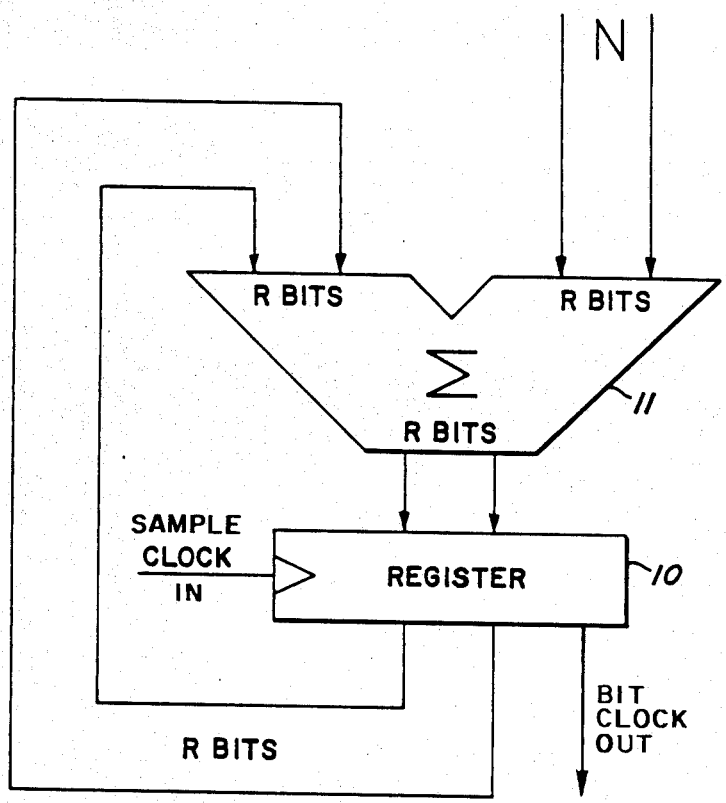
FIG. 1 is a block diagram of the circuit.

The device used to achieve this high resolution and large dynamic range is a rate multiplier, implemented through the use of arithmetic. The output frequency of this device is generated by the state of the most significant bit of an accumulator which is accumulating a number N, as shown in FIG. 1. Assume FA is the frequency at which an accumulator is being clocked, R is the size of the accumulator and associated registers, in bits, and N is the number of sample clocks between bit clocks. Then the frequency out, FOUT, equals $FA \times N/2$ to the Rth power. In other words, the output frequency is sample clock frequency reduced by the ratio of N divided by the size of the accumulator. That is, for every overflow there is an output bit clock.

Referring to FIG. 1, at the time of every sample clock pulse, the accumulated total in the register 10 is added in the accumulator 11 to N and the new total is reloaded into the register 10. The MSB of the register 10 can then be used as the bit clock, FOUT. One advantage of this system can now be seen, the output frequency is a linear function of the input number N.

Figure 2:
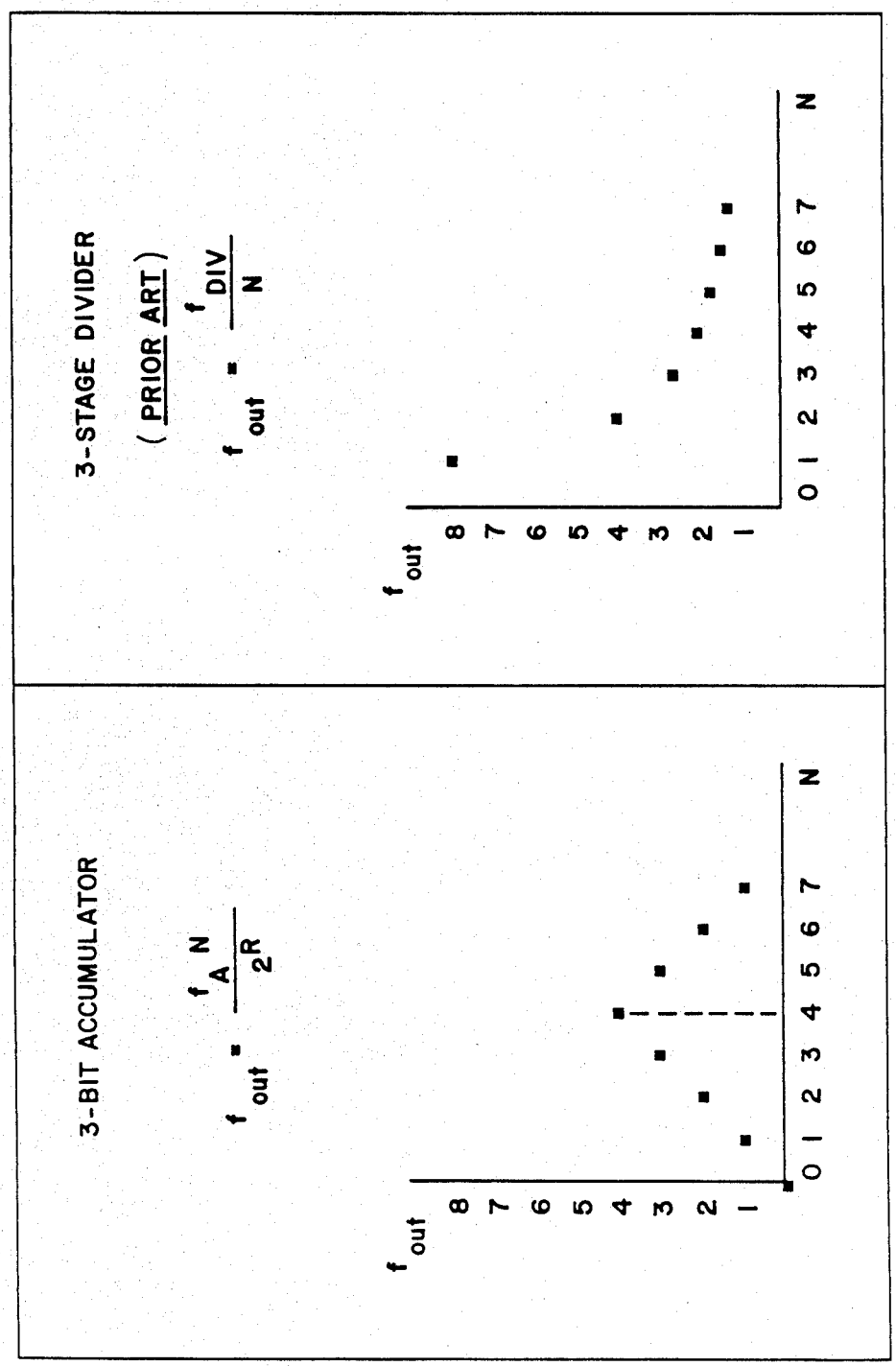
FIG. 2 is a set of graphs showing the relationships between the correction number and the output frequency.

This is not true in the prior art, where the number N is used in the denominator, resulting in the output frequency being a non-linear function of N. This is a result of this invention using addition instead of division for generating the output frequency. This relationship is illustrated in FIG. 2 which shows frequency out as a function of a variation in N for a three bit accumulator. For a three stage divider, a linear variation in N results in an exponential variation in frequency. In the three-bit accumulator, a linear variation in N results in a linear variation in frequency.

An additional benefit is the ease of computation. In the prior system using a divisor, there are too many values to be stored in a look-up table, and there is not enough time to efficiently calculate N in real time. This solution, based on addition, allows the speed generation of the proper bit clock frequency. This circuit uses this basic concept to simultaneously correct for motor hunt, polygon signature and non-linearity errors.

Linearity must be corrected for many times during each scan. For the typical case where the scan is lower at the center of its travel than it is at the ends, the scan can be divided into a number of segments, and a correction number N can be assigned to each segment. Counter 12 is reset at the beginning of the scan, and then incremented at the beginning of each segment. The counter output is then used to address a PROM 13, the output of which is the appropriate number, A, for that segment.

The signature and hunt corrections are both numbers that are constant for the duration of the scan. These are added, and buffered through register 14, to produce the number B. Numbers A and B are then added in the adder 15 to produce the current number N. The remainder of the circuit then performs as described above to produce output bit clocks at a frequency, FOUT.

While the invention has been described with reference to specific embodiments, it will be understood by those skilled in the art that various changes will be made and equivalents may be subsituted for elements thereof without departing from the spirit and scope of the invention. In addition, many modifications may be made without departing from the essential teachings of the invention.

What is claimed is:

1. A circuit for matching the current frequency of a bit clock to the current span speed of a raster scanner comprising:
   means for generating a number which is a linear function of the instantaneous scan speed,
   means for generating fixed frequency sample clock pulses, and
   accumulator means for adding, at the time of each sample clock, the current sum of said accumulator to said number to generate a new sum, one bit of said sum being output as said bit clock,
   wherein said number is a correction number for motor hunt, polygon signature and scan nonlinearity errors.

* * * * *